Jan. 7, 1958  M. H. FRANK  2,818,843
PUSH ROD
Filed Sept. 15, 1955
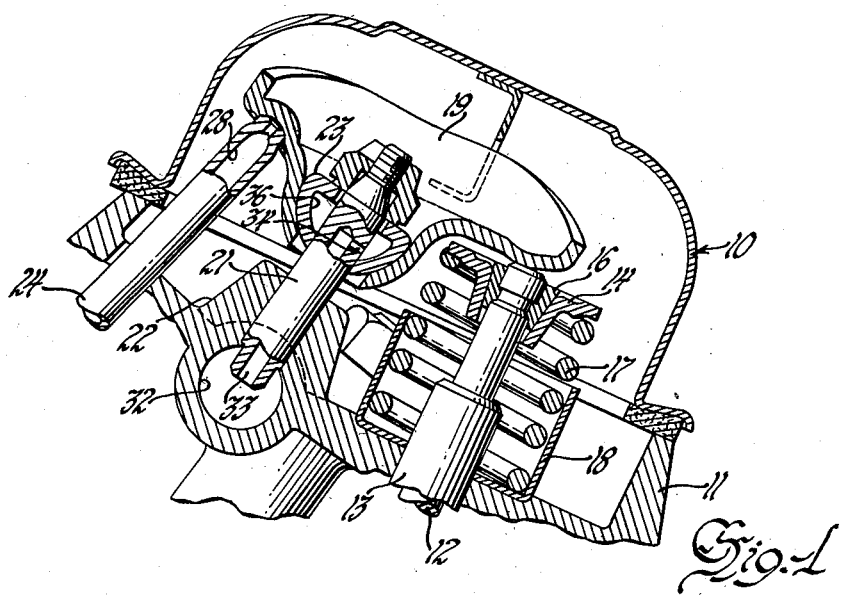
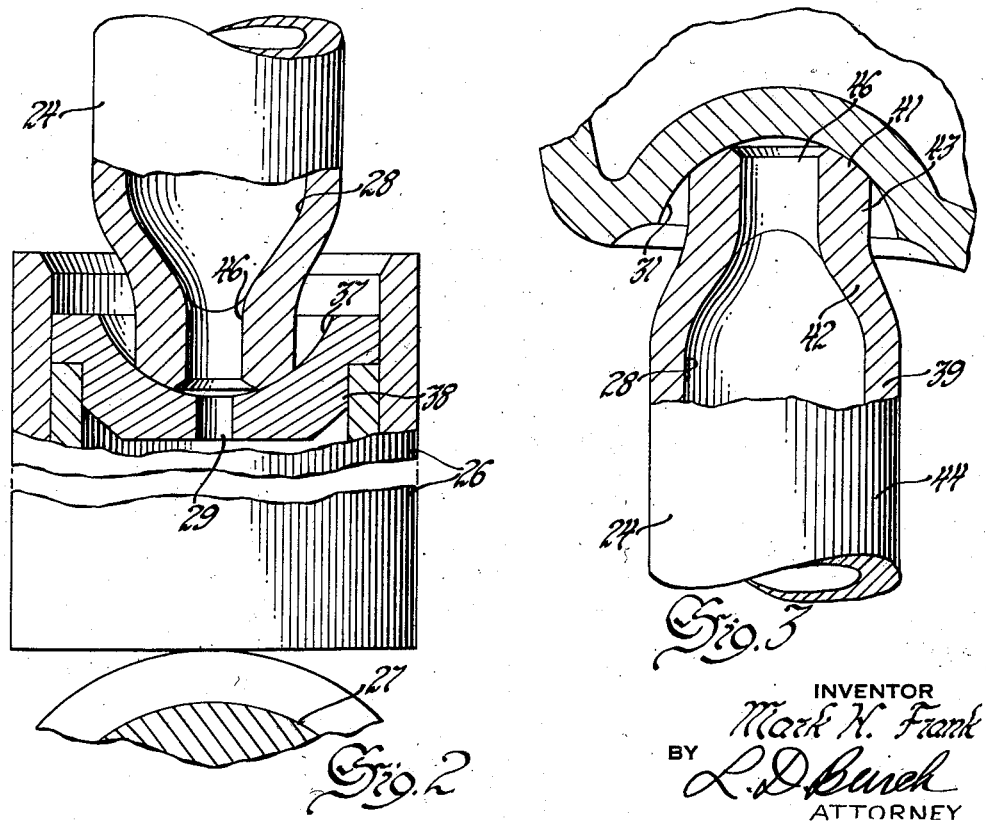
INVENTOR
Mark H. Frank
BY
L. D. Burch
ATTORNEY

United States Patent Office 2,818,843
Patented Jan. 7, 1958

2,818,843
PUSH ROD

Mark H. Frank, Birmingham, Mich., assignor to General Motors Corporation, Detroit, Mich., a corporation of Delaware Application September 15, 1955, Serial No. 534,481

2 Claims. (Cl. 123—90)

This invention relates to push rods for engines and is especially applicable for employment in high speed high compression ratio internal combustion engines for automotive and other uses.

It is desirable to employ hollow tubular push rods in engines because it is possible to construct a rod of this kind that is stronger and stiffer than a solid rod of the same weight. However, the larger these rods may be the thinner the walls may become and thin wall tubing does not provide strong and rigid bearing surfaces at the opposite ends thereof.

It is now proposed to employ relatively large thin wall tubing and to increase the wall thickness adjacent the opposite ends of a push rod made from such tubing to provide better bearing means at the ends thereof. It is also proposed to decrease the diameter of the tubing adjacent the opposite ends of each push rod to provide annular bearing means that will be closer to the axis of the push rod and hence less likely to bend in a system of mechanism in which one of the members engaged by the push rod is an oscillating member.

In the drawing:

Fig. 1 is a fragmentary cross sectional view of an internal combustion engine. Fig. 1 particularly illustrates the outer end of a push rod embodying the invention and employed for oscillating a rocker arm for operating one of the valves of the engine;

Fig. 2 is a fragmentary view illustrating the inner end of the push rod shown by Fig. 1 and illustrating how the push rod is seated in a tappet operated by the camshaft of the engine.

Fig. 3 is an enlarged fragmentary view of the outer end of the push rod shown by Fig. 1 and illustrating how the end of the rod is seated in the end of a rocker arm.

The engine 10 in which the invention is employed may be a high speed high compression ratio internal combustion engine for automotive or other purposes. The engine 10 may have one or more heads 11 for closing the outer ends of the cylinders of the engine. The cylinders may have combustion chambers, the explosive charges for which are supplied to and exhausted therefrom by valves such as that indicated at 12. In the present instance the valve 12 operates in a valve guide 13 rigidly secured in an opening in the head 11. The outer end of the valve stem supports a flanged collar 14 which is secured to the end of the rod by tapered segments indicated at 16. A valve spring 17 is adapted to be compressed between the collar 14 and the head 11 of the engine. A valve spring damper such as that indicated at 18 may be employed between the spring 17 and the head 11.

The stem of the valve 12 may be operated by a rocker arm 19 supported by the outer end of a stud 21 pressed or otherwise secured in an opening in a boss 22 formed in the outer surface of the head. The stud may be provided with a hemispherical bearing 23 adapted to engage a hemispherical bearing surface formed intermediate the ends of the rocker arm 19.

The end of the rocker arm 19 opposite the valve 12 is adapted to be enggaed by a push rod 24 the opposite end of which is supported by a valve tappet 26 adapted to be operated by the camshaft 27 of the engine. The push rod 24 is tubular and hollow to provide a passage 28 therein that may be employed in the lubricating system for the engine 10 if this is desirable. In the present instance the passage 28 is supplied with oil under pressure through an orifice 29 in the valve lifter 26. The valve lifter 26 is a hydraulic type valve lifter which exhausts the oil employed in the operation thereof through the orifice 29. The opposite end of the rod 24 opens into a hemispherical socket 31 in the adjacent end of the rocker arm 19. The oil supplied by the passage 28 may be employed in lubricating the socket 31. By the provision of suitable passages through the rocker arm 19 adjacent the socket 31 the oil also may be employed in lubricating the bearing 23 which supports the rocker arm 19. In the present instance bearing 23 has additional means for the lubrication thereof. This means includes an oil supply passage 32 formed in the head 11 and communicating with a passage 33 in the stud 21 which terminates in an outlet orifice 34 within the bearing 23. An annular chamber 36 within the bearing 23 is adapted to receive oil from the orifice 34 and to supply the oil to the outer surface of the bearing 23 through suitable passages and grooves formed in the bearing 23 or in the bearing surface formed on the rocker arm 19.

The push rod 24 is adapted to be constructed of relatively large thin wall tubing so that the rod will be as strong and stiff as possible and without excessive weight. However, it may be desirable to provide spherical annular bearing surfaces on the ends of the rod to engage the bearing surface 31 and a similar hemispherical bearing surface 37 in a support 38 forming the head end of the valve lifter 26. In order that the rod 24 will be as strong as possible adjacent the bearing surfaces formed at the ends thereof it is proposed to increase the wall thickness of the tubing from which the push rod 24 is formed adjacent the ends of the rod. This may be done in any suitable manner as by upsetting the tube at the ends of the rod, thereby causing the wall thickness to increase or taper towards the ends of the rod. The normal wall thickness is shown by Fig. 3 at 39. The increased wall thickness is indicated at 41, there being a section 42 therebetween where the wall thickness gradually increases toward the end of the rod.

It is also considered preferable to decrease the diameter of each end of the rod 24 so that the annular bearing surface formed thereon will be near the axis of the rod. This may be done by decreasing the diameter of the tube to provide reduced cylindrical surfaces 43 adjacent the outer ends of the rod and larger cylindrical surfaces 44 therebetween.

In such a construction it will be apparent that the passage 28 within the push rod 24 will be a larger passage intermediate the ends of the rod and smaller passages 46 will be provided at the ends of the rod.

All of the inlet and exhaust valves for each cylinder of the engine 10 may be provided with push rods such as that indicated at 24.

It will be apparent that the increase in thickness of the tubing wall adjacent the ends of the push rod 24 will increase the strength of the rod and prevent the bearing surfaces adjacent the ends thereof from being distorted and damaged in use by the severe impact loads to which the rod is subjected. Also, decreasing the diameter of the tube at the ends of the rod will further increase the strength of the structure by locating the bearing surfaces at the ends of the rod closer to the axis of the rod.

I claim:

1. A push rod for employment in the valve actuating mechanism of an internal combustion engine and comprising an elongated tubular member having axial thrust bearing means at the opposite ends thereof, said tubular member being formed to provide passage means extending throughout the length of said push rod and through said axial thrust bearing means, said passage means being of larger cross section between said ends than at said ends, said tubular member having wall thicknesses between said ends that are less than at said ends, said passage means of larger cross section and said wall thicknesses between said ends being relatively constant throughout the greater part of the length of said push rod between said ends and axially changing toward said ends into passage means of smaller cross section at said ends and into wall thicknesses of greater thickness at said ends, said tubular member between the bearing surfaces of said axial thrust bearing means being formed by the same wall means.

2. A push rod as defined by claim 1 and in which said tubular member is reduced in size at the ends thereof and at said axial thrust bearing means.

References Cited in the file of this patent

UNITED STATES PATENTS

| | | |
|---|---|---|
| 2,053,743 | Russell | Sept. 8, 1936 |
| 2,123,681 | Willgoos | July 12, 1938 |
| 2,484,923 | Anderson | Oct. 18, 1949 |
| 2,610,617 | Pielstick | Sept. 16, 1952 |
| 2,705,482 | Randol | Apr. 5, 1955 |
| 2,743,712 | Hulsing | May 1, 1956 |